United States Patent [19]

Eudy

[11] Patent Number: 5,244,047
[45] Date of Patent: Sep. 14, 1993

[54] APPARATUS FOR COUPLING IMPLEMENTS TO A FARM TRACTOR

[75] Inventor: Joe H. Eudy, Rte. 1, Box 16, Danville, Ala. 35619

[73] Assignees: Arthur H. Groover; Aaron Boyd Clark, both of Hartselle; Joe H. Eudy, Danville, all of Ala.

[21] Appl. No.: 740,410

[22] Filed: Aug. 5, 1991

[51] Int. Cl.5 .............................................. A01B 51/00
[52] U.S. Cl. ..................................... 172/275; 280/509; 37/231
[58] Field of Search ........................ 172/272, 275, 439; 280/460.1, 508, 509; 37/237; 414/723

[56] References Cited

U.S. PATENT DOCUMENTS

| | | | |
|---|---|---|---|
| 774,903 | 11/1904 | Ammann | 280/508 |
| 911,456 | 2/1909 | Stenger | 280/508 |
| 1,437,836 | 12/1922 | Ferris | 280/509 |
| 2,597,096 | 5/1952 | Harris | 280/509 |
| 2,869,654 | 1/1959 | Hershman | 172/272 |
| 3,065,977 | 11/1962 | Virtue | 280/460 |
| 3,116,075 | 12/1963 | Hershman et al. | 280/479 |
| 3,312,478 | 4/1967 | Knaapi | 280/405 |
| 3,512,804 | 5/1970 | Siegert | 37/237 |
| 4,135,731 | 1/1979 | Lorenz et al. | 280/461 |
| 4,146,246 | 3/1979 | Geistloff | 172/275 |
| 4,549,744 | 10/1985 | Herr et al. | 280/415 |
| 4,850,789 | 7/1989 | Zimmermann | 414/703 |
| 4,871,292 | 10/1989 | Milanowski | 414/723 |
| 4,958,848 | 9/1990 | Nash | 280/508 |
| 5,031,927 | 7/1991 | Frenette | 280/509 |

FOREIGN PATENT DOCUMENTS

| | | | |
|---|---|---|---|
| 1028431 | 4/1958 | Fed. Rep. of Germany | 280/508 |
| 1029240 | 4/1958 | Fed. Rep. of Germany | 280/508 |
| 1030193 | 5/1958 | Fed. Rep. of Germany | 280/508 |
| 1063908 | 8/1959 | Fed. Rep. of Germany | 280/508 |
| 1164323 | 2/1964 | Fed. Rep. of Germany | 414/723 |

Primary Examiner—David H. Corbin
Assistant Examiner—Spencer Warnick
Attorney, Agent, or Firm—Hopkins & Thomas

[57] ABSTRACT

An apparatus for coupling a tractor's three point hitch system to a ground working implement comprises a U-shaped frame mountable at one end to the hitch system and having rearwardly open grooves formed in its other end. An automatically locking and quick release latch assembly is mounted between the walls of the frame and responds automatically to movement of an implement's latch pins into the grooves to capture and lock the latch pins in place so that the implement can be pulled by the tractor. For release of the implement, a simple tug on a cord attached to the latch assembly releases the latch pins of the implement so that the tractor can simply pull away from the decoupled implement.

1 Claim, 2 Drawing Sheets

APPARATUS FOR COUPLING IMPLEMENTS TO A FARM TRACTOR

TECHNICAL FIELD

The present invention relates generally to farming and specifically to devices for use with the three-point hitch system of a farm tractor to couple ground working implements to the tractor for use and to decouple implements from the tractor after use.

BACKGROUND OF THE INVENTION

Three point hitch systems have been used for many years to couple ground working implements such as plows and harrows to the back of farm tractors for tilling or otherwise working farm land. These hitch systems generally comprise a pair of spaced elongated bars known as draft links that are pivotally mounted to the lower portion of the tractor frame and extend rearwardly therefrom to distal ends. An upper link is also mounted to the tractor frame and extends to a distal end that is disposed above and between the distal ends of the lower draft links. The distal ends of the draft links and the distal end of the upper link are usually provided with manual or semiautomatic latch mechanisms adapted to receive and be securely latched onto the three corresponding latch pins or tow bars of an implement to be coupled to the tractor; thus the name "three point hitch".

One or more selectively extendable and retractable hydraulic rams are generally coupled between the tractor frame and one or both of the draft lengths or between the frame and the upper link. With such an arrangement and with an implement coupled to the hitch and latched in place, the ram or rams can be actuated to raise the hitch system (and thus the implement coupled thereto) for transport of the implement to a remote location, and to lower the hitch system and implement for working the ground.

In the past, a number of latch mechanisms have been developed for coupling farm implements to a tractor's three point hitch system. Examples of such latch mechanisms are illustrated in U.S. Pat. Nos. 2,869,654 of Hershman; 4,549,744 of Herr et al; 4,135,731 of Lorenz et al; 3,065,977 of Virtue et al; and 3,116,075 of Hershman et al. While devices such as those illustrated in these patents have generally represented improvements over purely manual latching means such as removable pins, they nevertheless have exhibited various problems and shortcomings inherent in their own respective designs. Most, for example, require for proper latching or unlatching that the tractor operator dismount the tractor at some stage in the coupling process and manipulate portions of the assembly manually.

In some cases, such as with the device of U.S. Pat. No. 2,869,654, coupling an implement to the tractor requires the operator to back the tractor up to an implement, align the latches of the hitch with the latch pins of the implement, dismount the tractor, couple the upper link latch manually to the upper latch pin of the implement, remount the tractor, and raise the hitch system while pulling the tractor forward to engage the latches of the lower draft links. Obviously, this is a tedious and time consuming process that is inefficient and can be very wasteful, particularly in situations where implements must be changed frequently. Other prior art latch mechanisms also exhibit various degrees of difficulty and generally require some level of manual intervention for proper operation.

Consequently, a continuing and heretofore unaddressed need exists for a latch mechanism usable with a tractor's three point hitch system to couple and latch securely and automatically to the corresponding latch pins of a ground working implement without requiring the operator of the tractor to dismount the tractor and intervene manually. Further, such a latch mechanism should be quickly and easily detachable from the implement when desired, again without requiring the operator to dismount his tractor. It is to the provision of a latch mechanism that exhibits these and other advantages that the present invention is primarily directed.

SUMMARY OF THE INVENTION

The present invention is an apparatus for coupling ground working or other implements to a farm tractor and is particularly suited for use with tractors of the type having three point hitch systems for towing such implements. It will be understood throughout the following discussions that a total of three of the devices of this invention would normally be used with one each being securely mounted to the ends of the two draft links of the hitch system and the third being mounted to the distal end of the upper link of the hitch system. Obviously, however, other configurations or combinations are possible such that this preferred configuration should not be construed as a limitation of the scope of the present invention.

The apparatus comprises a heavy metal frame that is generally U-shaped in cross-section and that has a forward end portion and a rear end portion. The forward end portion of the frame is adapted to be mounted securely to the end of a draft or upper link of a three point hitch system by means of a bolt, pin or other appropriate fastener. The rear end portion of the frame is formed with a rearwardly open groove sized and configured to receive one of the towing tongues or latch pins of an implement to be coupled to the tractor.

An automatic latch assembly is disposed between the upstanding walls of the frame at the rear end portion thereof. The latch assembly comprises a pivotable latch member secured at the location of the rearwardly open grooves and an elongated latch keeper pivotally mounted between the walls and forwardly displaced from the latch member. The latch member is generally hook-shaped with an upper leg and a lower leg and is normally spring biased to a position wherein the lower leg is disposed generally below the rearwardly facing grooves and the inside of the upper leg is presented in the grooves to the latch pin of an implement as the latch pin moves into the grooves.

With this configuration, as an implement latch pin moves into the rearwardly facing grooves of the apparatus in response to a backing of the tractor toward the implement, the pin engages the inside surface of the latch member upper leg causing the latch member to pivot such that its upper leg moves toward engagement with the latch keeper. At the same time, the lower leg of the latch member rotates up and behind the advancing latch pin to capture the latch pin in the rearwardly facing grooves.

Further movement of the latch pin into the grooves moves the top edge of the latch member upper leg into engagement with the latch keeper. The latch keeper is formed with a notch positioned just below the point at which the latch member upper leg engages the latch keeper. As the upper leg moves further after engagement with the latch keeper, the latch keeper is forced to pivot forwardly until its notch aligns with the top edge of the latch member upper leg. At this position, the latch keeper springs back to its original position causing its notch to capture and lock onto the top edge of the latch member upper leg. The latch member is thus locked by the latch keeper in its forwardly pivoted position with its lower leg fully raised behind the latch pin of the implement to capture and lock the latch pin within the rearwardly facing grooves. The implement is thus securely coupled to the tractor and can be towed in the usual way for transport and use.

When it is desired to release the implement from the tractor, the top portion of the latch keeper, which protrudes upwardly from the frame of the apparatus, is simply pulled slightly toward the forward end of the apparatus. This action releases the top edge of the latch member's upper leg from the notch in the latch keeper allowing the latch member to pivot to its spring biased normal position and thus allowing the latch pin of the implement to move out of the rearwardly facing grooves as the tractor is pulled slowly forward. In practice, a chain or cord is usually coupled to the upper end of the latch keeper such that the latch keeper can be pulled by an operator from the tractor cab, thus eliminating the need for the operator to disembark the tractor.

It is therefore an object of this invention to provide an improved automatic latch assembly for use with three point hitch systems of tractors that locks onto the latch pins of a farm implement automatically as the tractor is backed toward the implement without requiring the tractor operator to dismount his tractor.

A further object of the invention is to provide an automatically coupling latch that can be decoupled from an implement quickly and easily from the cab or seat of the tractor.

Another object of the invention is to provide an automatic latch having a minimum of moving parts and thus enhanced reliability.

An additional object of the invention is to provide such a latch that is economical to produce and convenient to mount to a tractor and use therewith.

These and other objects, features, and advantages of the present invention will become more apparent upon review of the following detailed description taken in conjunction with the accompanying drawings.

DETAILED DESCRIPTION OF THE PREFERRED EMBODIMENT

Figure 1:
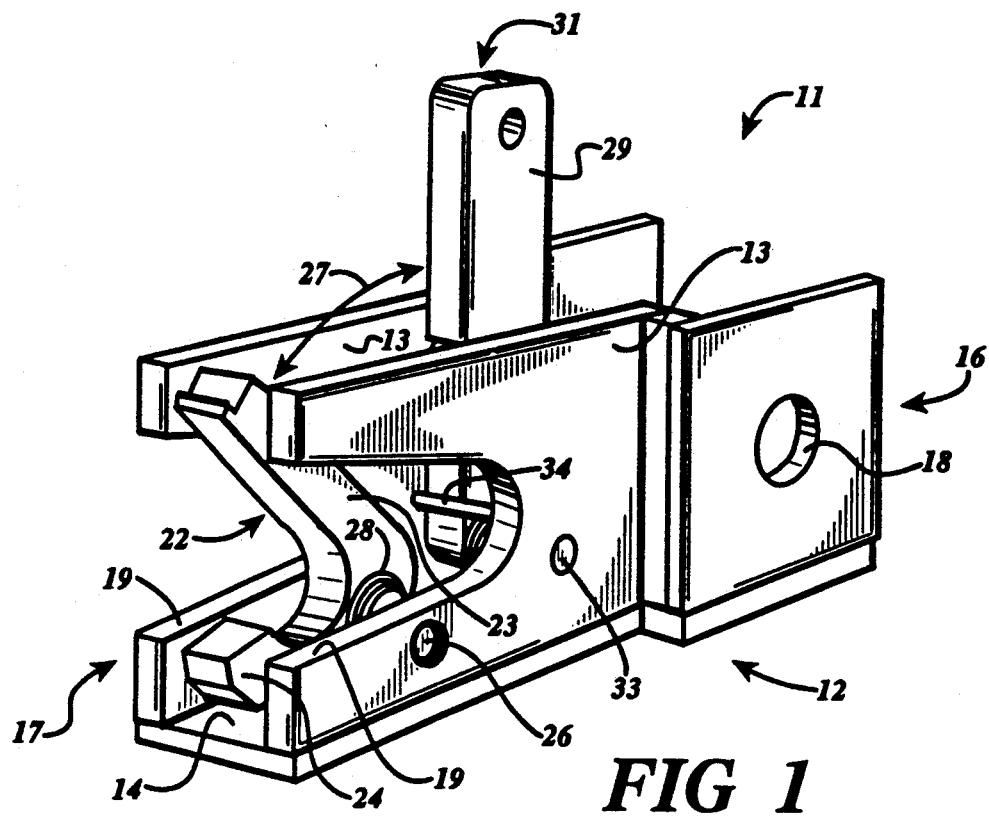
FIG. 1 is a perspective view of an apparatus that embodies principles of the present invention in a preferred form.

Referring now in more detail to the drawings, in which like numerals refer to like parts throughout the several views, FIG. 1 illustrates an apparatus 11 that embodies principles of the present invention in a preferred form. The apparatus 11 is seen to comprise a frame 12 that is preferably constructed of heavy sheet metal or other suitable material for strength and rigidity. The frame 12 is formed with an upwardly open generally U-shaped cross-section having spaced vertical walls 13 that extend upwardly from a lower plate 14.

The frame 12 has a forward end portion 16, which is adapted to be mounted securely to the end of a draft or upper link, and a rear end portion 17, which is adapted to receive and latch onto the latch pin of an implement to be coupled to a tractor. In the preferred embodiment, the front end portion 16 of the frame 12 is configured to receive between its vertical walls the end of a draft or upper link. Bores 18 are provided through the upper walls such that the frame 12 is securable to the end of a link by the means of a nut and bolt or removable pin. Naturally, any other suitable means for securing the frame 12 to a draft or upper link would function equally well. The frame 12 could even be permanently secured to the links if desired by means of a weld joint.

The rear end portion 17 of the frame 12 has vertical walls 13 that are formed to define matching rear facing grooves 19. The grooves 19 are sized to receive the horizontally extending latch pin or tow bar 21 (FIG. 2a) of an implement to be coupled to the tractor. The grooves 19 are preferably flared outwardly toward the rear end 17 of the frame 12 to form a mouth that is substantially wider at its open end than the diameter of a latch pin 21. With this configuration, a latch pin is received and guided toward the forward end of the grooves 19 as a tractor is backed toward an implement to be coupled, as detailed more fully below.

Figure 2A:
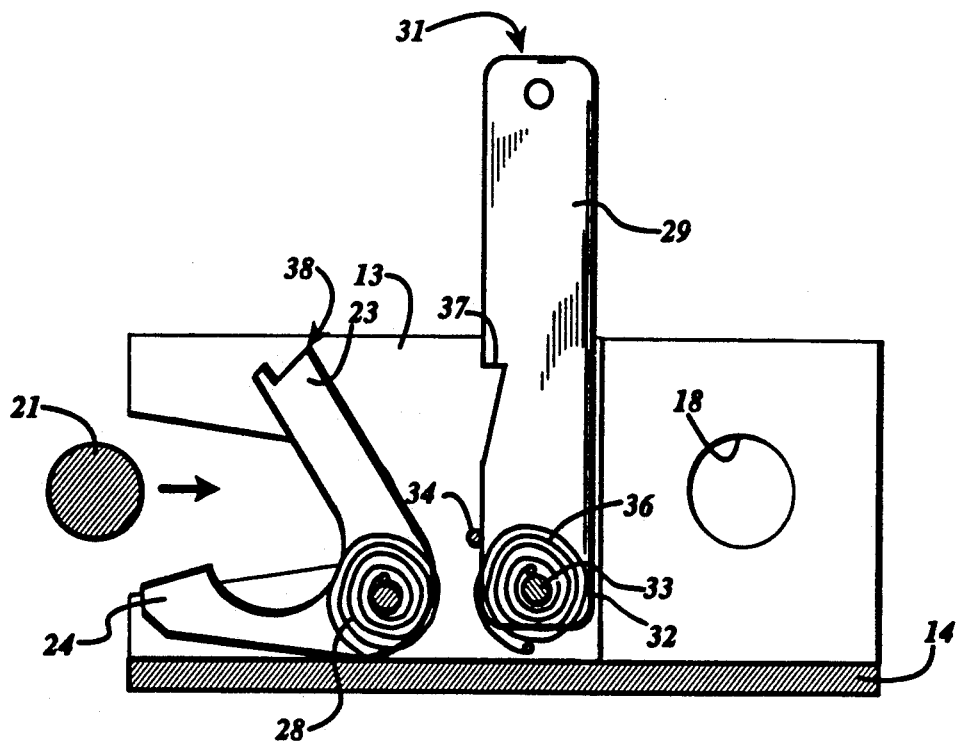
FIGS. 2a-2c are partially sectional side elevational views of the apparatus of FIG. 1 showing the functions of operational elements thereof for locking onto the latch pin of a farm implement.

A generally hook or J-shaped latch member 22 is preferably constructed of thick hardened metal and is formed with an upper leg 23 and a lower leg 24. A pivot pin 26 extends between the vertical walls 13 of the frame just below the rear facing grooves 19 formed therein and the latch member 22 is mounted on the pivot pin 26 for pivotal movement thereof in the direction indicated by arrow 27 of FIG. 1. As best seen in FIG. 2a, a spring 28 has its ends secured to the latch member 22 and the frame 12 respectively and is positioned to spring bias the latch member 22 to its rearwardly pivoted position with the lower leg 24 of the latch member disposed generally below the rearwardly open notches 19 and with the inside face of the latch member's upper leg 23 being presented to the latch pin of an implement as the pin moves into the grooves 19.

An elongated latch keeper 29, which is also preferably constructed of thick hardened metal, has an upper end 31 and a lower end 32. The latch keeper 29 is pivotally mounted by means of a pivot pin 33 between the vertical walls 13 of the frame 12 at a location forwardly displaced from the latch member 22. A stop 34 is positioned to engage the latch keeper 29 and prevent its pivoting rearwardly past an upstanding vertical orientation as illustrated in FIG. 2a. Of course, any means for limiting rearward pivotal movement of the latch keeper 29 could be employed with the stop 34 intended only as an exemplary embodiment.

A spring 36 is secured at its ends to the latch keeper 29 and frame 12 respectively and is positioned to spring bias the latch keeper 29 to its rearmost pivoted position against the stop 34 wherein the upper end 31 of the latch keeper extends vertically from between the walls 13 out of the frame 12. The latch keeper 29 can thus be pivoted forwardly against the bias of spring 36 and, when released, will be returned by the force of spring 36 to its vertically extending orientation.

Figure 2B:
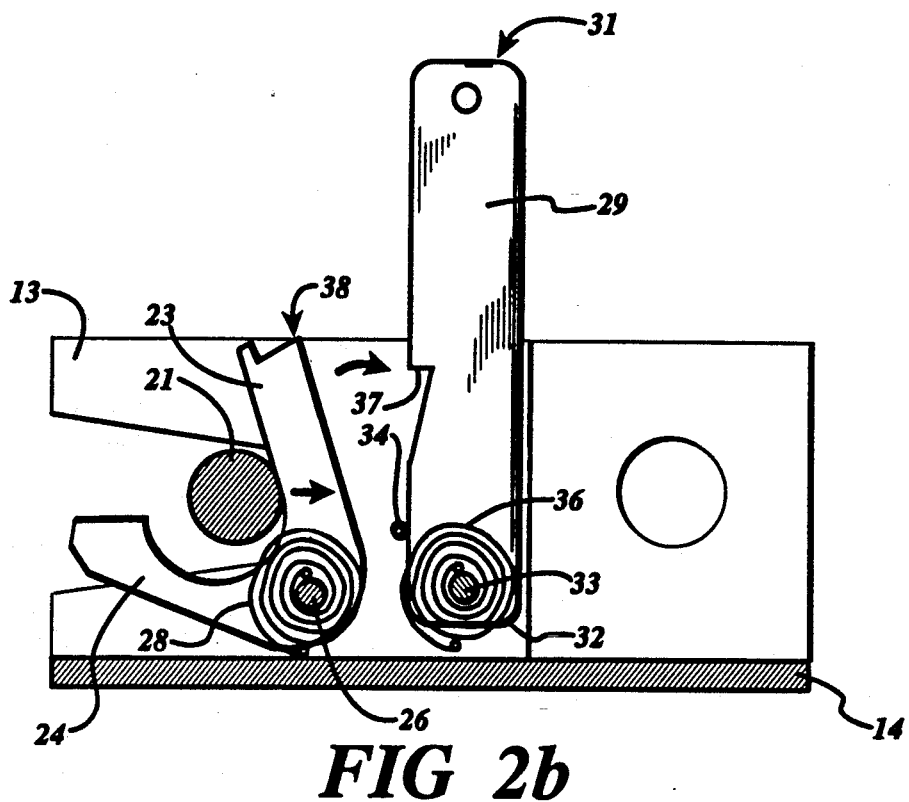
Figure 2C:
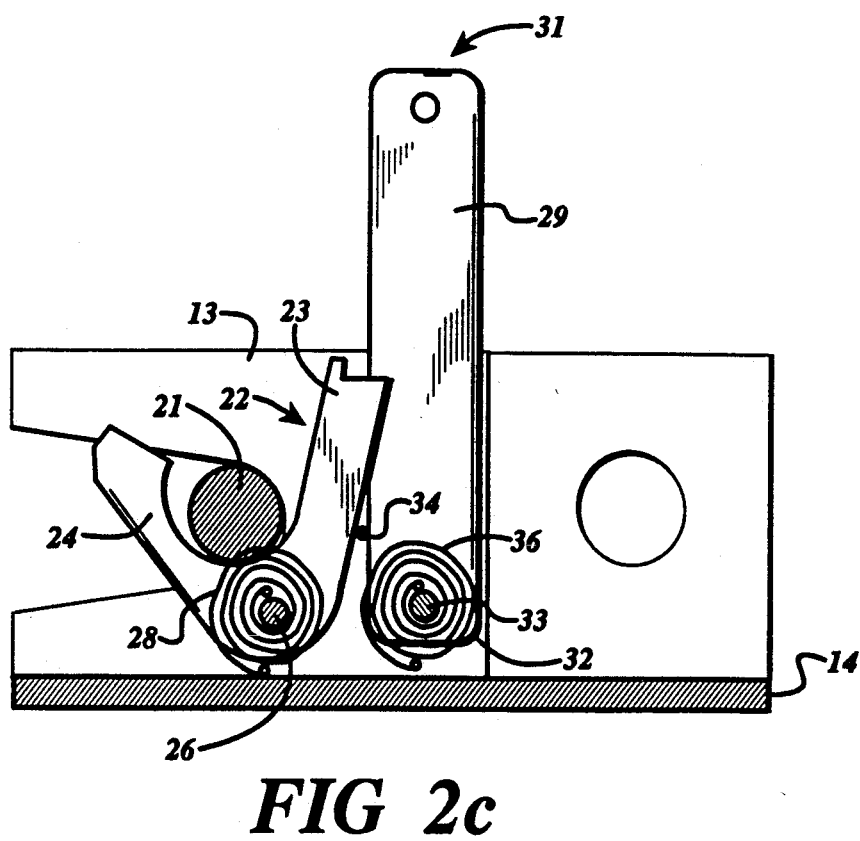

The rear edge of the latch keeper 29 is formed with a tooth or notch 37 that faces the upper leg 23 of the latch member 22. The notch 37 is positioned on the latch keeper 29 just below the position where the top edge 38 of the latch member upper arm 23 engages the latch keeper when the latch member is pivoted in a clockwise direction as seen in FIG. 2a. Further, the notch 37 is shaped to conform to the configuration of the top edge 38. In this way, as the latch member 22 pivots in a clockwise direction (FIG. 2a), the top edge 38 of its upper arm 23 eventually engages the latch keeper 29 just above the position of notch 37. Further rotation of the latch member 23 forces the latch keeper 29 to pivot forwardly against the bias of spring 36 until the top edge 38 of the latch member upper arm reaches the position of and aligns with notch 37. At this point, the latch keeper 29 springs back to its original position with the notch 37 receiving and capturing the top edge 38 of the latch member upper arm 23 (FIG. 2c). The latch member 22 is thus locked by the latch keeper 29 into its forwardmost pivoted position as illustrated in FIG. 2c. To unlock the latch member 22, the upper end 31 of the latch keeper 29 is simply moved forward slightly to pull the groove 37 off of the top edge 38 of the latch member upper arm thus allowing the latch member 22 to spring back to its original position as shown in FIGS. 1 and 2a.

OPERATION

Operation of the present invention will be described with reference to the sequence of operation illustrated in FIGS. 2a-2c. While these figures illustrate operation of only one of the devices of this invention, it will be understood that a total of three can be used simultaneously with the three point hitch of a tractor and that the other two would operate identically and simultaneously with the illustrated one.

Initially, an apparatus of this invention is securely mounted to the distal ends of the draft lengths and upper length of a tractor's three point hitch system. With the preferred embodiment, this can be done by slipping the front end portion of the frame 12 over the distal end of the link and inserting a bolt or pin through the link end and through the bores 18 of vertical walls 13. With the hitch system so equipped, the tractor is simply backed toward a ground working implement to be coupled thereto. As each of the devices of this invention approaches a corresponding latch pin 21 of the implement, the three point hitch can be lowered or raised by means of its hydraulic ram to align the latch pins 21 with the rearwardly open grooves 19 formed in the frames 12.

With the grooves aligned with latch pins 21, the tractor can be backed slowly toward the implement, which moves each of the implement's latch pins into the rearwardly open grooves 19 of a corresponding one of the latches of this invention as shown in FIG. 2a. As the tractor continues to back toward the implement (FIG. 2b), each of the implement's latch pins 21 engages the inside surface of its latch member's upper leg 23, which causes the latch member to begin to rotate about pivot pin 26 in a clockwise direction as seen in FIG. 2b. As the latch member rotates, its lower leg 24 begins to move upwardly behind the implement's advancing latch pin 21 and thus begins to capture the latch pin 21 within the grooves 19.

Ultimately, as the latch member rotates further, the top edge 38 of its upper arm 23 engages the latch keeper 29 just above the position of notches 37. Further movement of the latch member forces the latch keeper 29 to pivot to the right in FIG. 2b against the bias of spring 36 until the top edge 38 of the latch member's upper arm reaches the position of and aligns with notch 37. At this point, the latch keeper 29 springs back to its original position with its notch 37 embracing and locking onto the top edge 38 of the latch member's upper arm 23. With the latch member 22 thus locked in this position (FIG. 2c), its lower arm 24 is fully raised behind the implement's latch pin 21 thus capturing and locking the latch pin in place extending through the rearwardly open grooves 19.

With all three latch pins of the implement thus locked into position, the implement is securely coupled to the tractor and can be raised or lowered by means of the tractor's hydraulic ram and pulled by the tractor for its intended use. Preferably, the latch pins 21 are loosely restrained within their corresponding grooves 19 such that some swaying movement of the implement, which is desirable, is allowed.

When it is desired to release the implement from the tractor, the tractor operator lowers the implement until it rests upon the ground. He then can simply tug upon cords or chains that are attached to the upper ends 31 of the latch keepers 29, pulling the latch keepers forward until their notches 37 move off of the top edges 38 of corresponding latch member upper arms 23. The springs 28 then cause the latch members 22 to snap back to their original positions as shown in FIG. 2a, thus releasing the latch pins of the implement. The tractor operator can then simply drive the tractor forward and pull it away from the implement and can move the tractor to another implement to be coupled or park the tractor if desired.

Thus, it is seen that a tractor equipped with devices of the present invention is easily coupled to and decoupled from ground working implements with no requirement that the tractor operator dismount the tractor to oversee the coupling operation. The device of this invention is also rugged and virtually error proof, thus making it reliable and economical to use as compared to prior art latch assemblies.

The invention has been described herein in terms of a preferred embodiment. It will be understood by persons of skill in the art, however, that numerous additions, deletions, and modifications might well be made to the illustrated embodiment without departing from the spirit and scope of the invention as set forth in the claims.

I claim:

1. An apparatus for use with a three point hitch system of a farm tractor to couple ground working implements to the tractor and decouple the implements from the tractor, the apparatus comprising:

a frame having a lower plate, a forward end portion for attaching said frame to a tractor, and a rear end portion for receiving and locking onto an implement to be coupled to the tractor;

said forward end portion of said frame being defined by a first pair of spaced substantially parallel walls fixed to and extending upwardly from said lower plate, each of said walls having a central bore formed therethrough with the central bores in said walls being aligned to provide means for attaching said frame to a tractor with said rear end portion of said frame extending rearwardly from said tractor;

said rear end portion of said frame being defined by a second pair of spaced substantially parallel walls fixed to and extending upwardly from said lower plate, said second pair of spaced substantially parallel walls being spaced apart a distance less than the spacing between said first pair of spaced substantially parallel walls;

each of said second pair of spaced substantially parallel walls being formed with a generally V-shaped rearwardly facing notch, said notches being horizontally aligned to define a rearwardly facing groove for receiving a latch pin of an implement to be coupled to the tractor, said groove having a lower extent and an upper extent;

said walls and said lower plate together defining for said frame a generally U-shaped cross-section with an open top;

a hook-shaped latch member having an upper leg and a lower leg and being pivotably secured between said second pair of spaced substantially parallel walls at a location adjacent to the V-shaped notches formed therein, said latch member being pivotable between an unlatched position wherein said lower leg is disposed substantially below the lower extent of said rearwardly facing groove with said upper leg extending upwardly and rearwardly and being exposed within said rearwardly facing groove, and a latched position wherein said lower leg extends upwardly to span said rearwardly facing groove and said upper leg extends upwardly and forwardly, said hook-shaped latch member being yieldably spring biased to its unlatched position;

said upper leg of said hook-shaped latch member having a top edge that is rearwardly and downwardly beveled toward said lower plate when said hook-shaped latch member is in its latched position;

a single piece locking means for locking said latch member in its latched position in response to pivotal motion of said latch member toward its latched position;

said locking means comprising an elongated latch keeper having a top end and a bottom end and being pivotably secured at its bottom end between said second pair of spaced parallel walls at a location adjacent to said lower plate and forwardly displaced from said latch member, said latch keeper extending upwardly from between said second pair of spaced parallel walls to its top end;

said latch keeper being pivotable between a first substantially vertical orientation and a second upwardly and forwardly extending orientation and being yieldably spring biased to its first substantially vertical orientation;

said latch keeper being located to be engaged intermediate its ends and pivoted forwardly by the beveled top edge of said upper leg of said latch member as said latch member pivots toward its latched position;

said latch keeper being formed with a saw tooth-shaped notch located intermediate its ends and being positioned below the location where said latch member upper leg initially engages said latch keeper, said saw tooth-shaped notch being positioned and sized to receive and at least partially cover the beveled top edge of said latch member upper leg when said latch member is pivoted fully to its latched position thus exerting downward pressure on said beveled top edge to lock said latch member securely but releasably in its latched position, whereby the latch pin of an implement moving progressively into the rearwardly facing groove engages the exposed upper leg of the latch member causing the latch member to pivot toward its latched position thereby bringing the lower leg of the latch member up and behind the moving latch pin to capture the latch pin in the rearwardly facing groove, continued progressive movement of said latch pin causing the beveled top edge of the latch member upper leg to engage the latch keeper and pivot the latch keeper forwardly until the saw tooth-shaped notch of the latch keeper snaps over the beveled top edge of the latch member upper leg to lock the latch member in its latched position securely capturing the implement's latch pin in the rearwardly facing groove, whereupon the latch keeper can be pulled forwardly at its top end to release the latch member and thereby decouple the implement.

* * * * *